Oct. 13, 1959   W. J. ROOS   2,908,347
ELECTROSTATIC PRECIPITATORS
Filed Oct. 21, 1957   2 Sheets-Sheet 1
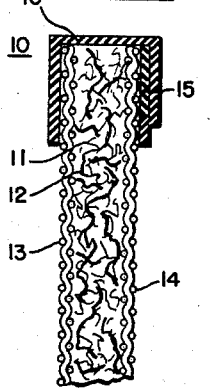
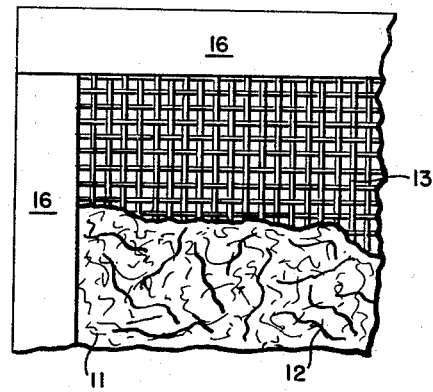
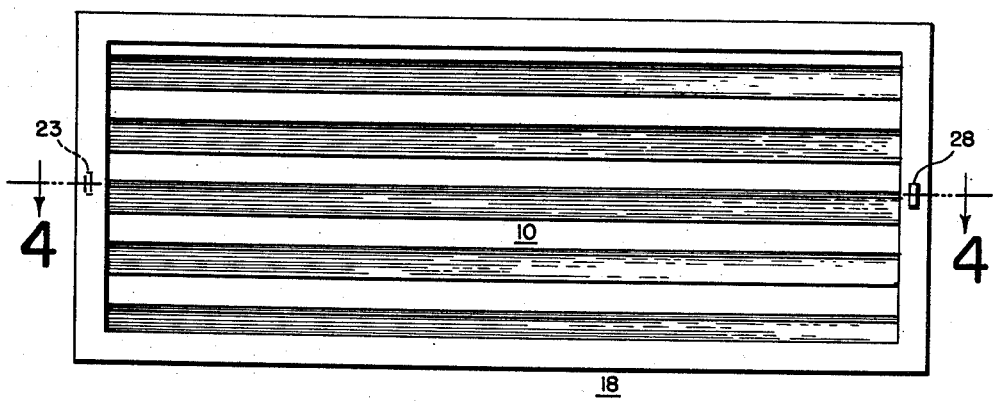
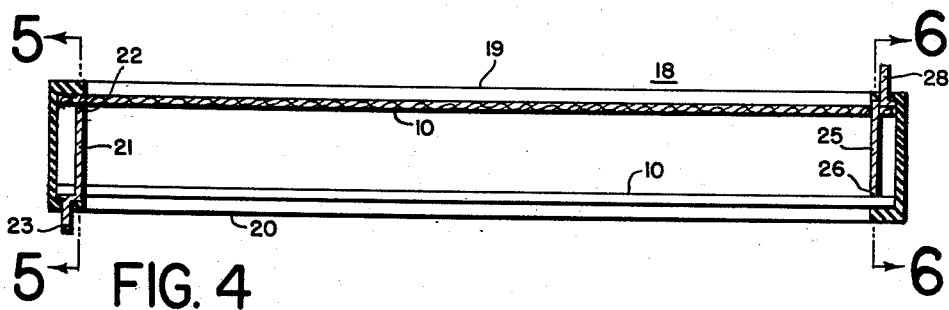
WILLIAM J. ROOS
INVENTOR
BY Robert J. Palmer
ATTORNEY Oct. 13, 1959 W. J. ROOS 2,908,347
ELECTROSTATIC PRECIPITATORS
Filed Oct. 21, 1957 2 Sheets-Sheet 2

WILLIAM J. ROOS
INVENTOR
BY Robert J. Palmer
ATTORNEY

United States Patent Office 2,908,347
Patented Oct. 13, 1959

2,908,347

ELECTROSTATIC PRECIPITATORS

William J. Roos, Sharon, Mass., assignor to Westinghouse Electric Corporation, East Pittsburgh, Pa., a corporation of Pennsylvania Application October 21, 1957, Serial No. 691,246

10 Claims. (Cl. 183—7)

This invention relates to disposable collector cells for electrostatic precipitators.

This application is a continuation-in-part of my application, Serial No. 593,429, filed June 25, 1956, now abandoned.

Many electrostatic precipitators used for cleaning air for ventilation, have disposable collector cells of the electrostatically charged, glass-wool type. In some such precipitators, metal screens are located upstream and downstream (with respect to air flow) of the collector cells, one such screen of a cell being connected to the positive terminal of a high voltage D.C. source, and the other screen of the cell being connected to the negative terminal of the source, and to ground.

Such glass-wool type collector cells are inexpensive, and are in demand for cleaning the air in standard air conditioning units. One disadvantage of such a collector cell is that due to its closely spaced filaments or fibres, its resistance to air flow is high. For reducing such air resistance, it has been the practice to use very thin mats of filaments, the thin mats being folded in zig-zag outlines for increasing the air contacting surfaces.

It is desirable for economy of space, and ease of servicing and replacement, to have each such collector cell equipped with its own charging electrode screens in contact with its upstream and downstream sides. Attempts to use metal screens in contact with the upstream and downstream sides of such folded mats have been unsuccessful. Due to the flexibility of the screens and of the mats, the spacing between the upstream and downstream screens was always irregular, with arc-overs frequently occurring between too closely spaced portions of the screens, this fault being aggravated by dirt loading and by humidity.

For preventing such arc-overs, the practice employed with plate type collector cells, of placing a high resistance in series with a cell and its power pack for limiting current to a safe value cannot be followed for the voltage from the power pack would be so reduced that the cell would be ineffective. One manufacturer has attempted to overcome this problem by dividing a mat into three parts, each part being connected to a power pack by an isolating resistor. An arc-over in one of the three cell parts would render that part only ineffective for electrostatic collection, the other two cell parts continuing in normal operation. The efficiency of collection would, of course, be reduced one-third.

A feature of my invention is that I use as an integral part of a thin, flexible, glass-wool type mat, flexible, semi-conductive screens in intimate contact with the upstream and downstream sides of the mat, the two screens of a mat being insulated from each other. I have found that not only do such flexible, semi-conductive screens provide intimate contact with a flexible mat, and provide higher efficiencies than metal screens, but that the semi-conductive screens provide distributed instead of lumped, isolating resistances, each elemental portion of a cell mat being connected to a power pack through the high resistances of the screens. An arc-over at one elemental mat portion would render that portion only ineffective for electrostatic collection.

Another feature of my invention is that I intermesh with the dielectric or non-conductive filaments of a mat, semi-conductive filaments which increase the electrostatic charges on and the voltage gradients between the non-conductive filaments, resulting in greatly increased collection efficiency.

An object of my invention is to increase the efficiency of a collector cell using a mat of electrostatically charged dielectric filaments.

Another object of my invention is to electrostatically charge elemental portions of a mat of dielectric filaments through distributed isolating resistors.

My invention will now be described with reference to the annexed drawings, of which:

Fig. 1 is a fragmentary, sectional end view of a filter mat embodying my invention;

Fig. 2 is a fragmentary side view of the mat with a portion of its adjacent semi-conductive screen removed;

Fig. 3 is a plan view of a collector cell embodying my invention, using the mat of Figs. 1 and 2 folded in a zig-zag outline;

Fig. 4 is a section along the line 4—4 of Fig. 3;

Figure 5:
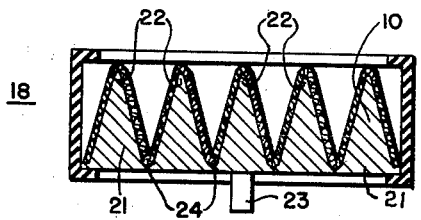
Fig. 5 is a section along the line 5—5 of Fig. 4.

In the following, dielectric and non-conductive means non-conductive at the voltages, not exceeding 15,000 volts, used with electrostatic air cleaners.

A filter mat 10 has dielectric filaments 11 such as glass wool, paper or plastic filaments or fibres such as are widely used for air cleaning, intermeshed at random with a smaller number of semi-conductive filaments or fibres 12. The mat 10 has in contact with one side, a coarse-mesh screen 13, and has in contact with its opposite side, a similar screen 14. These screens may be 20 x 12 mesh, unbleached crinoline, impregnated first with "C" starch for stiffening, and then treated for rendering them semi-conductive.

Thin strips of non-conductive tape such as stiff paper, cardboard or plastic, are placed along the edges of the mat for stiffening the mat edges, and non-conductive, adhesive tapes 16 are folded over the edges of the mat and around the strips 15.

The normally non-conductive screens 13, and 14 and the normally non-conductive filaments 12 may be treated for rendering them semi-conductive by coating them with Du Pont CM which is a well known and widely used fire-proofing liquid, but which I have used for rendering the screens 13 and filaments 12 poorly conductive although the added fire-proofing is useful. Such treatment has provided an electrical resistivity of from 50 to 200 megohms per square, surface resistivity, which has proved very satisfactory. Other well known methods of rendering non-conductors semi-conductive may be used, such as the applications of pastes and liquids used in printed circuit technique for making printed circuit resistors, or such as the applications of petroleum jelly, or dispersed carbon or other conductive particles.

Figure 6:
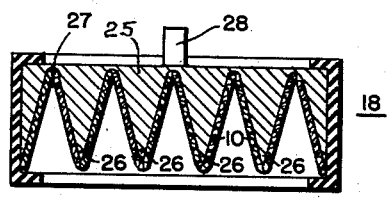
Fig. 6 is a section along the line 6—6 of Fig. 4.

Referring now to Figs. 3–6, a mat 10 with screens 13 and 14 thereon, is folded in a zig-zag outline, and placed within a case 18 of electrical insulation such as cardboard or a plastic, having an open air inlet side 19 and an open air outlet side 20, the case 18 otherwise being closed. Within one end of the case 18, and extending transversely thereacross, is a sawtooth shaped metal plate 21 having as shown by Figs. 4 and 5, upper teeth 22 on which rest the upper apices of the folded mat. A metal tab 23 extends from the plate 21 through the adjacent side of the case and forms one high voltage terminal. The lower apices of the folded mat rest in the V's 24 between the teeth 22. Within the other end of the case 18, and extending transversely thereacross, is a sawtooth shaped metal plate 25 having as shown by Figs. 4 and 6, lower teeth 26 over which are fitted the lower apices of the folded mat 10. The upper apices of the folded mat extend into the inverted V's between the teeth 26. A metal tab 28 extends from the plate 25 through the adjacent side of the case 18, and forms the other high voltage terminal. The plate 21 contacts one side of the mat 10 at one end, and the plate 25 contacts the opposite side of the mat at its oposite end so that every elemental portion of the mat is connected to its power supply through a resistance equal to that of one of the screens 13 or 14, assuming that the screen resistances are the same. This will be discussed in more detail in connection with Fig. 7.

Figure 8:
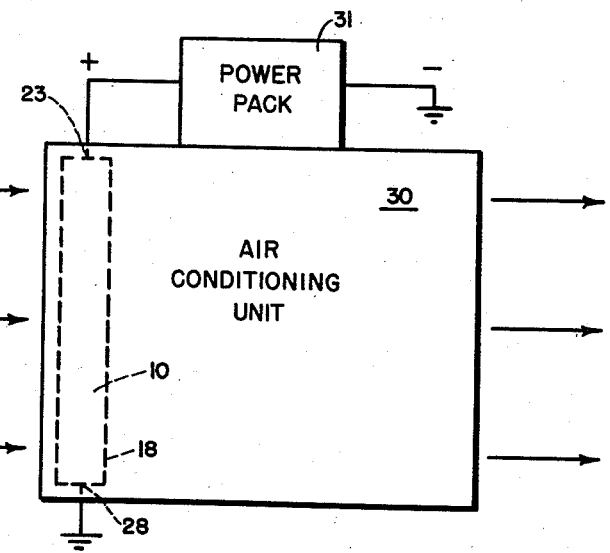
Fig. 8 is a side view of an air conditioning unit using the collector cell of Fig. 3 for cleaning the air entering the unit.

Fig. 8 shows a conventional air conditioning unit 30 having a conventional power pack 31 on its top, and having a case 18 with a folded mat 10 therein, extending within the air inlet passage of the unit 30, the positive terminal of the power pack being connected to the terminal 23 of the mat, and the negative terminal of the power pack being connected to the terminal 28 of the mat through ground.

In operation, the high voltage D.C. applied to the screens 13 and 14 produces an electrostatic field between the screens, causing the dielectric filaments 11 and the semi-conductive filaments 12 to be charged by electrostatic induction. The dust particles approaching the upstream screen receive mirror image charges. The electrostatic fields between the filaments drive the charged dust particles to the oppositely charged filaments. A mixture of 20% semi-conductive filaments with 80% non-conductive filaments resulted in an increase in efficiency of 20% over a similar mat containing 100% non-conductive filaments, all other conditions being the same. The semi-conductive filaments not only act as collector electrodes, but act to increase the charges on and the voltage gradients between the dielectric filaments.

It is well known that electrostatic fields between oppositely charged collector electrodes are necessary for satisfactory collection of dust by electrostatic action, and that the attraction of charged dust particles to oppositely charged collector electrodes is not sufficient. Consider the usual collector plate structure with positively charged plates alternating with negative plates. Dust particles given positive electrostatic charges by an ionizer are driven by the electrostatic fields between positive and negative plates to the negative plates. If the attracting force of the negative plates on the positively charged dust particles was substantial, then the positive plates would not be necessary.

In a glass-wool type collector mat, different dielectric filaments are charged by electrostatic induction at different points along their lengths depending upon the distances of the different points from the charging screens, to different voltages. The dielectric filaments lie in random directions, but consider two parallel, spaced-apart, dielectric filaments extending perpendicular to but spaced from the spaced-apart, parallel charging screens. The two filaments are charged to the same voltage at corresponding points along their lengths so that there are no electrostatic fields between such points.

Many of the adjacent dielectric filaments extend at small angles to the screens and have facing points charged to the same voltage or to slightly different voltages so that there are no or small electrostatic fields therebetween. Placing the conductive filaments 12 among the non-conductive filaments 11 results in higher voltages on and in larger voltage gradients between the non-conductive filaments. Each filament 12 being conductive, becomes charged along its length to the highest induced voltage, and acts as a probe charging electrode, increasing the charge on many non-conductive filaments it contacts or which it closely approaches, to a higher voltage than they would be charged to by the more remote screens if there were no conductive filaments. Higher voltage gradients exist between those non-conductive filaments close to the conductive filaments than exist between those non-conductive filaments more remote from the conductive filaments. Two mats similar in every respect except that one contained 20% conductive filaments 12 and 80% non-conductive filaments 11, while the other contained 100% non-conductive filaments, with the same voltage applied to both mats, were tested under exactly the same conditions. The mat with the conductive filaments had collection efficiencies which decreased from 80% at 100 feet per minute air velocity, to 40% at 600 feet per minute air velocity. The mat with all non-conductive filaments had collection efficiencies which decreased from 60% at an air velocity of 100 feet per minute, to 20% at an air velocity of 600 feet per minute. Thus, a gain in efficiency of 20% resulted from the use of the conductive filaments.

Figure 7:
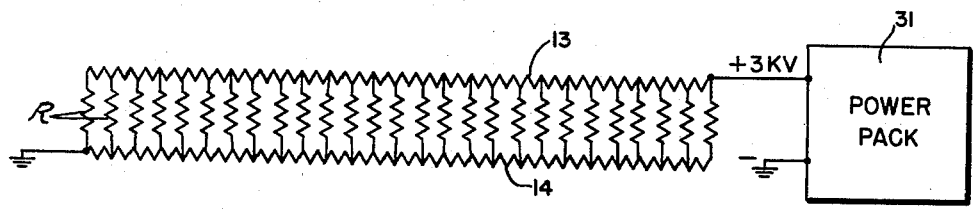
Fig. 7 is an equivalent circuit along a longitudinal section of the mat.

The semi-conductive charging screens 13 and 14 serve as distributed isolating resistors, isolating every elemental portion of the mat from the power pack. Isolating resistors are not in themselves novel, being disclosed in the H. A. Wintermute Patent No. 1,968,330 in which a single, high voltage power pack serves a number of precipitator units through individual isolating resistors. The resistive screens 13 and 14, however, provide in effect, an infinite number of isolating resistors, preventing a short circuit in any elemental portion of the mat from causing the voltage from the power pack to the other elemental portions of the mat from decreasing to any important extent. An equivalent circuit is shown by Fig. 7. A screen 13 is seen to be connected at one end of the mat to the power pack, while the screen 14 is seen to be connected at the opposite end of the mat to the power pack. The resistances of a number of elemental portions of the mat are shown as resistors R between the screens 13 and 14. It is obvious that if a short circuit occurs across any one of the resistors between the screens, there will be, assuming the screens have the same resistance, always the same value of isolating resistance between each such short circuited resistor and the power pack. The current caused by such a short circuit has to flow from the power pack through one of the screens to the short circuit, and then through the other screen back to the power pack. Thus, the resistance of one screen is always in series with an elemental mat portion and the power pack, regardless of the locations of the elemental mat portions. A short circuit at one elemental mat portion disables that portion but has no appreciable effect on the other mat portions.

Although the filaments of the mat are mostly dielectrics, there is a small current flow through the mat caused by charges leaking to ground. In fact, unless there was this leakage, the space charge effect after an initial period of collection would prevent further collection. The resistances of the semi-conductive screens should not, therefore, be great enough to prevent this leakage current. I have found that the resistances of the screens should not exceed 1,000 megohms per square.

If the resistances of the screens are too low, then the short circuit flow through one or more elemental portions of a mat may cause so great a current flow that the power pack used with this type of collector cell may be so overloaded that it cannot effectively energize the cell. I have found that the resistance of a screen should not be less than three megohms per square.

The resistance of a typical mat using dielectric, glass-wool type filaments, is about $5 \times 10^{14}$ ohms per square so that it is non-conductive at the voltages used with electrostatic precipitators. Charges on such dielectrics cannot be carried by conduction. Such dielectrics can be charged by electrostatic induction only. A filament 11 having different points along its length spaced different distances from the charging screens would be charged to different voltages at the different points. By making the filaments 12 poorly conductive as by coating them as described in the foregoing, to have resistances, for example, in the range of 50 to 200 megohms per square, the filaments 12 can act as probe charging electrodes penetrating the mat, and increasing the charges on and the voltage gradients between the non-conductive filaments 11. The filaments 12 preferably should not be good conductors for if they were, the chance of occurrence of short circuit paths between the screens would be increased.

It will be noted that, in the examples given in the preceding paragraph, the filaments 11 have resistances of from 50,000 to 200,000 as great as the resistances of the filaments 12.

While two voltage applying members 21 and 25 are shown at opposite ends of opposite sides of a mat 10, a mat could be divided into mat parts with voltage applying members at the opposite ends of opposite sides of the mat parts. In the annexed claims, "a mat" is to be considered as a mat part where a mat is divided into parts.

What I claim is:

1. In an electrostatic precipitator having a high voltage D.C. power pack, and spaced-apart charging electrodes connected to said power pack, the combination of a collector cell between said electrodes, said cell comprising a mat of non-conductive filaments having interspersed therewith a number of conductive filaments.

2. The combination claimed in claim 1 in which the conductive filaments are normally non-conductive filaments having conductive coatings thereon, the surface resistivities of said conductive filaments being between 50 and 200 megohms per square.

3. In an electrostatic precipitator having a high voltage D.C. power pack with positive and negative output terminals, the combination of a collector cell comprising a mat containing non-conductive filaments, means for electrostatically charging said filaments comprising screen-shaped, distributed isolating resistors in contact with the opposite sides of the mat and extending from one end of the mat to its opposite end, means connecting one of said resistors at said one end of said mat to one of said terminals, and means connecting the other one of said resistors at said opposite end of said mat to the other one of said terminals.

4. The combination claimed in claim 3 in which the mat contains conductive filaments interspersed with said non-conductive filaments.

5. The combination claimed in claim 4 in which the conductive filaments have surface resistivities between 50 and 200 megohms per square.

6. The combination claimed in claim 5 in which the isolating resistors are close-mesh cloth having conductive coatings thereon, the surface resistivities of said resistors being between 3 and 1,000 megohms per square.

7. The combination claimed in claim 3 in which the isolating resistors are close-mesh cloth having conductive coatings thereon, the surface resistivities of said resistors being between 3 and 1,000 megohms per square.

8. In an electrostatic precipitator having a high voltage D.C. power pack with positive and negative output terminals, the combination of a collector cell comprising a mat of non-conductive filaments, means for electrostatically charging said mat comprising screen-shaped distributed isolating resistors in contact with the opposite sides of the mat, means connecting one of said resistors at a plurality of points extending transversely of the mat to one of said terminals, and means connecting the other of said resistors at a plurality of points extending transversely of the mat but spaced longitudinally of the mat from said first mentioned points to the other of said terminals.

9. The combination claimed in claim 8 in which the isolating resistors are close-mesh cloth having conductive coatings thereon, the surface resistivities of said resistors being between 3 and 1,000 megohms per square.

10. The combination claimed in claim 8 in which the non-conductive filaments have a smaller number of conductive filaments interspersed therewith, said conductive filaments having surface resistivities between 50 and 200 megohms per square.

References Cited in the file of this patent

UNITED STATES PATENTS

| | | |
|---|---|---|
| 1,541,677 | Anderson | June 9, 1925 |
| 2,297,601 | Williams | Sept. 29, 1942 |
| 2,729,302 | True | Jan. 3, 1956 |
| 2,818,134 | Powers | Dec. 31, 1957 |